United States Patent [19] [11] 3,904,944

Carrick et al. [45] Sept. 9, 1975

[54] MACHINE TOOL CONTROL

[75] Inventors: Warner W. Carrick, Sterling Heights; Herbert E. Friedman, Lake Orion, both of Mich.

[73] Assignee: The Babcock & Wilcox Company, New York, N.Y.

[22] Filed: Jan. 2, 1974

[21] Appl. No.: 429,862

[52] U.S. Cl. ................ 318/578; 318/162; 318/661; 90/13 B

[51] Int. Cl.$^2$ .......................................... G05B 19/36

[58] Field of Search ........ 318/578, 162, 661; 82/19; 90/13 B

[56] References Cited
UNITED STATES PATENTS

| | | | |
|---|---|---|---|
| 2,983,858 | 5/1961 | Herndon, Jr. | 318/578 |
| 3,259,819 | 7/1966 | Heiser | 318/578 |
| 3,355,641 | 11/1967 | Eisengrein et al. | 318/578 X |
| 3,457,484 | 7/1969 | Shimizu et al. | 318/578 |
| 3,609,322 | 9/1971 | Burnett | 318/578 X |
| 3,728,597 | 4/1973 | Cummens et al. | 318/578 X |

*Primary Examiner*—B. Dobeck

*Attorney, Agent, or Firm*—Barnes, Kisselle, Raisch & Choate

[57] ABSTRACT

A machine tool control comprising a base, a first slide mounted on the base for vertical movement relative to the base, a second slide mounted on said first slide for horizontal movement relative to the first slide, the second slide is adapted to support a plurality of tools. Drive means individual to each slide are provided for moving the slides. A work support is rotatably mounted on the base. The control further comprises a pair of rotary templates or cams supported for rotation about a single axis. A stylus is provided for each cam and follows the contour of its respective cam as the cam is rotated. A rotary electronic resolver is associated with each follower for producing an analog signal in response to movement of the stylus. A rotary electronic resolver is associated with each slide for producing an analog signal corresponding to the position of the slide. Means are provided for converting each analog signal to a digital signal and for comparing the digital signals. When there is predetermined differential between the signals the drive means for the slides are energized to move the slides and, in turn, the tools relative to the work support.

10 Claims, 9 Drawing Figures

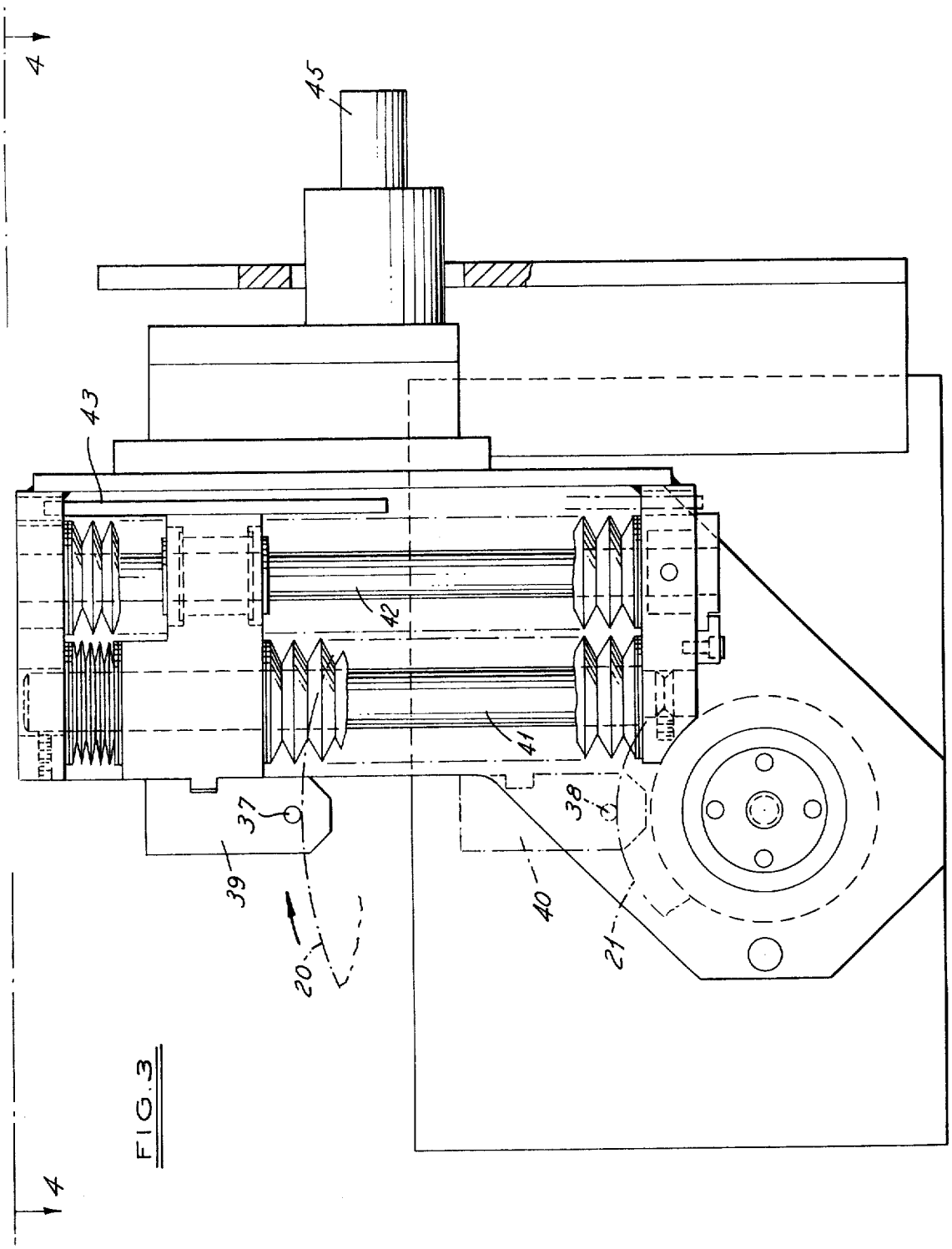

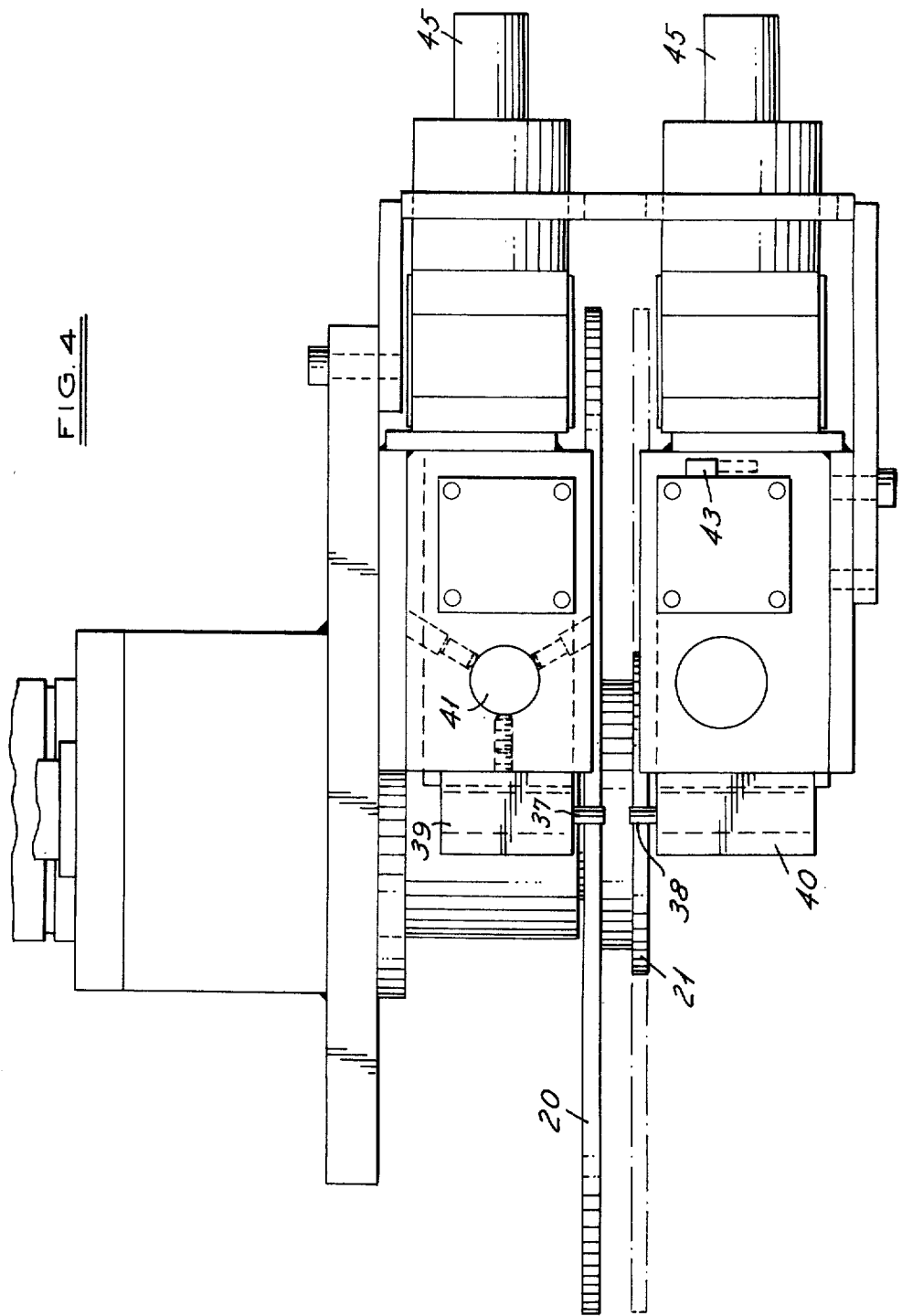

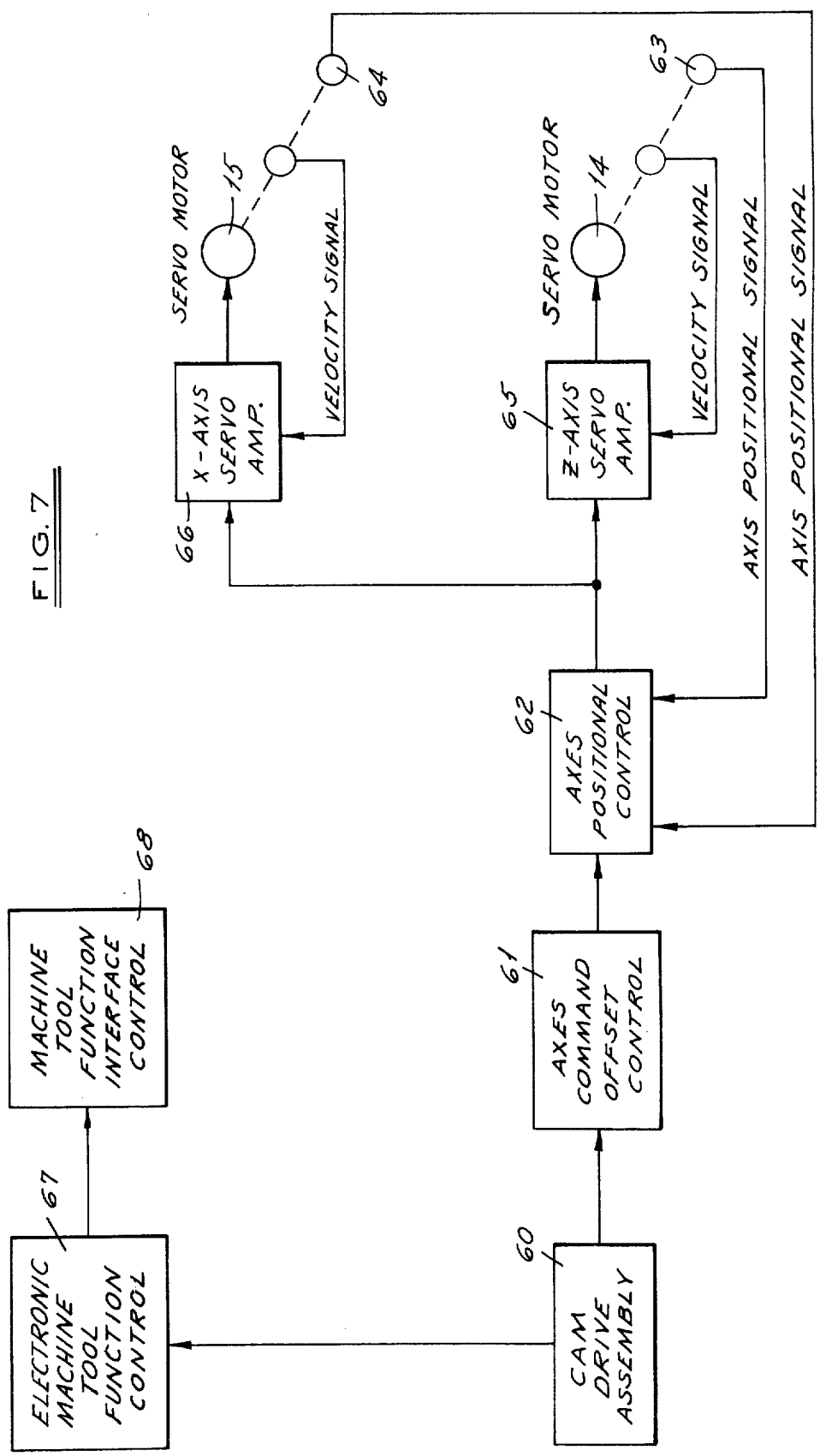

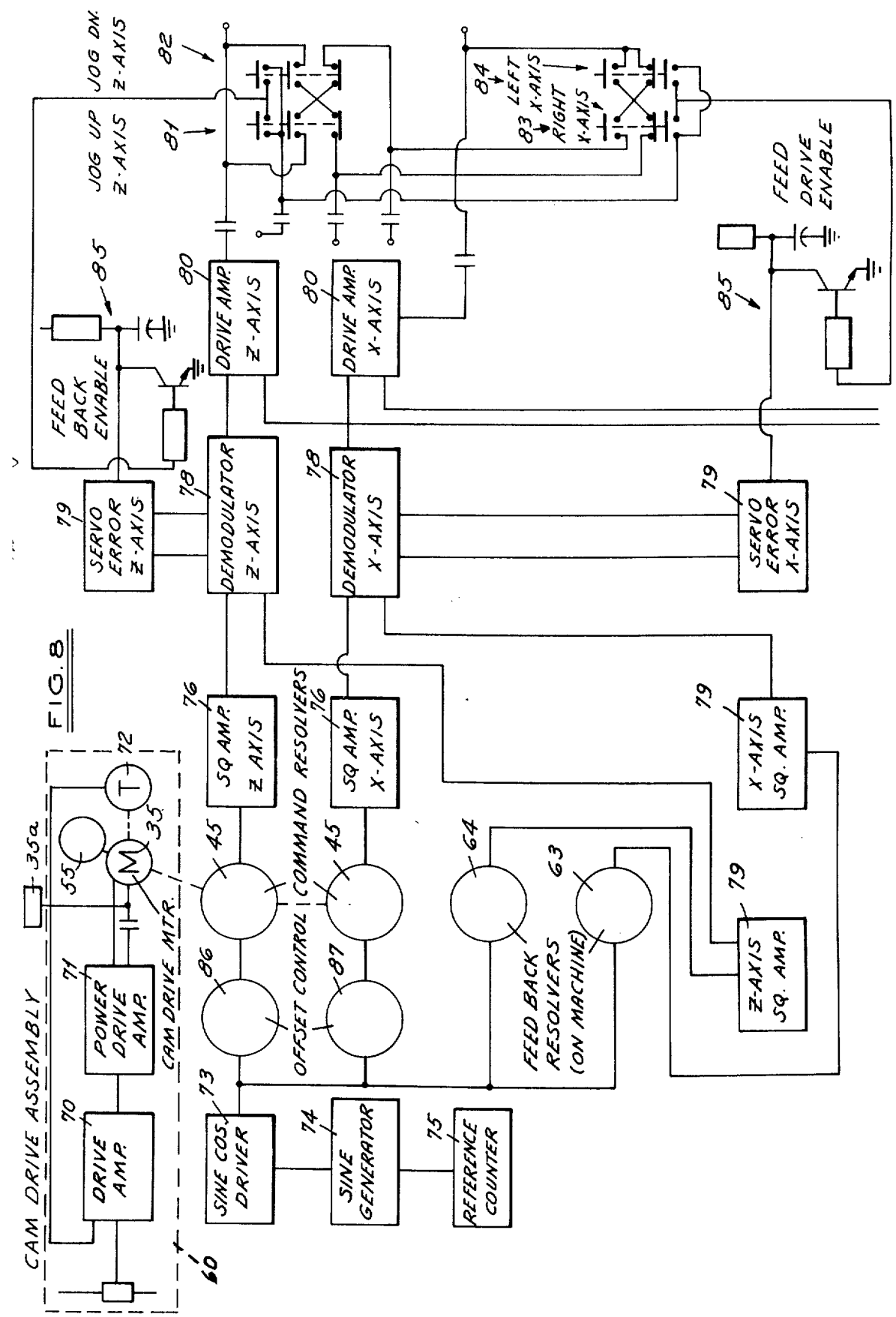

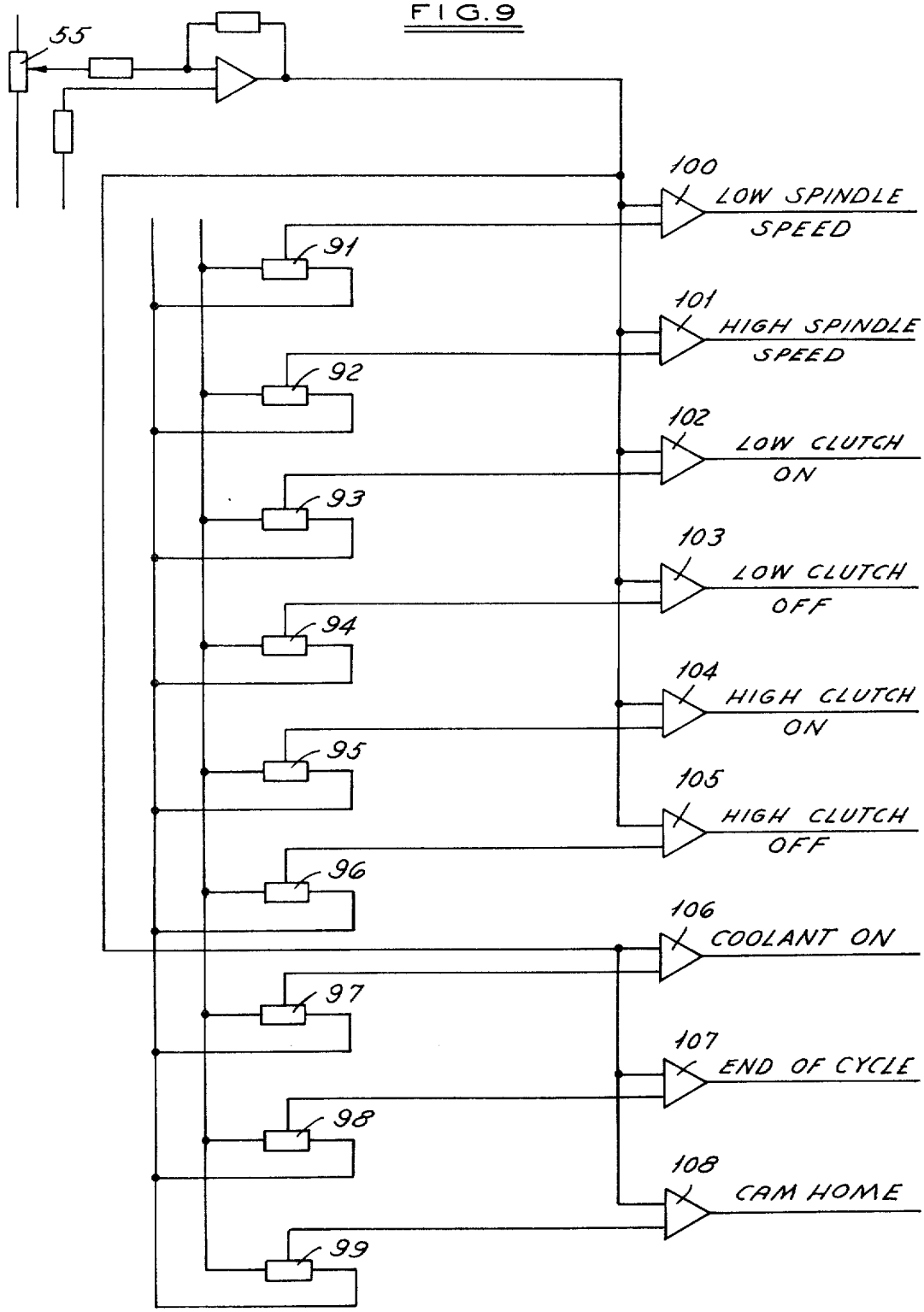

MACHINE TOOL CONTROL

This invention relates to machine tools and particularly control of machine tools.

BACKGROUND OF THE INVENTION

In the control of movement of machine tools, it has been common to utilize mechanical, hydraulic an electronic tracers for producing predetermined movement of the tool. Where the part being acted upon by the tools involves a relatively simple movement between the work and the tools, such controls have been successful and may comprise, for example, hydraulic tracers. However, where the movements required are complex, it is difficult to produce a tracer that will follow the contour properly. For example, where there are undercut portions of a workpiece, a conventional linear type tracer is ineffective.

In one type that has been commercially used for such complex machining, shown in U.S. Pat. No. 3,346,961, dual cams are provided for each axis of movement and a complex hydraulic valve is acted upon directly by the tracer. Such hydraulic devices necessitate precision manufacture of the valves, careful filtering of the hydraulic fluid, and continual maintenance.

Among the objects of the invention are to provide a machine tool control which will produce accurate complex parts without the disadvantages of a hydraulic system; which is relatively simple; which is easily maintainable; and which can be readily operated to produce parts repeatedly.

SUMMARY OF THE INVENTION

In accordance with the invention a machine tool control comprises a base, a first slide mounted on the base for vertical movement relative to the base, a second slide mounted on said first slide for horizontal movement relative to the first slide. The second slide is adapted to support a plurality of tools. Drive means individual to each slide are provided for moving the slide. A work support is rotatably mounted on the base means. A pair of rotary templates or cams is supported for rotation about a single axis. A stylus is provided for each said cam and follows the contour of its respective cam as the cam is rotated. A rotary electronic resolver is associated with each said follower for producing an analog signal in response to movement of the stylus. A rotary electronic feedback resolver is associated with each slide for producing an analog signal corresponding to the position of the slide. Means are provided for converting each analog signal to a digital signal and for comparing the digital signals. When there is a predetermined differential between the signals the drive means for the slides are energized to move the slides and, in turn, the tools relative to the work support.

DESCRIPTION OF THE DRAWINGS

FIG. 3 is a sectional view taken along the line 3—3 in FIG. 2.

FIG. 4 is a view taken along the line 4—4 in FIG. 3.

FIG. 7 is a block diagram of the electronic system.

FIG. 8 is a more specific block diagram of a portion of the electronic system.

FIG. 9 is a diagram of a portion of the electronic system.

DESCRIPTION

Figure 1:
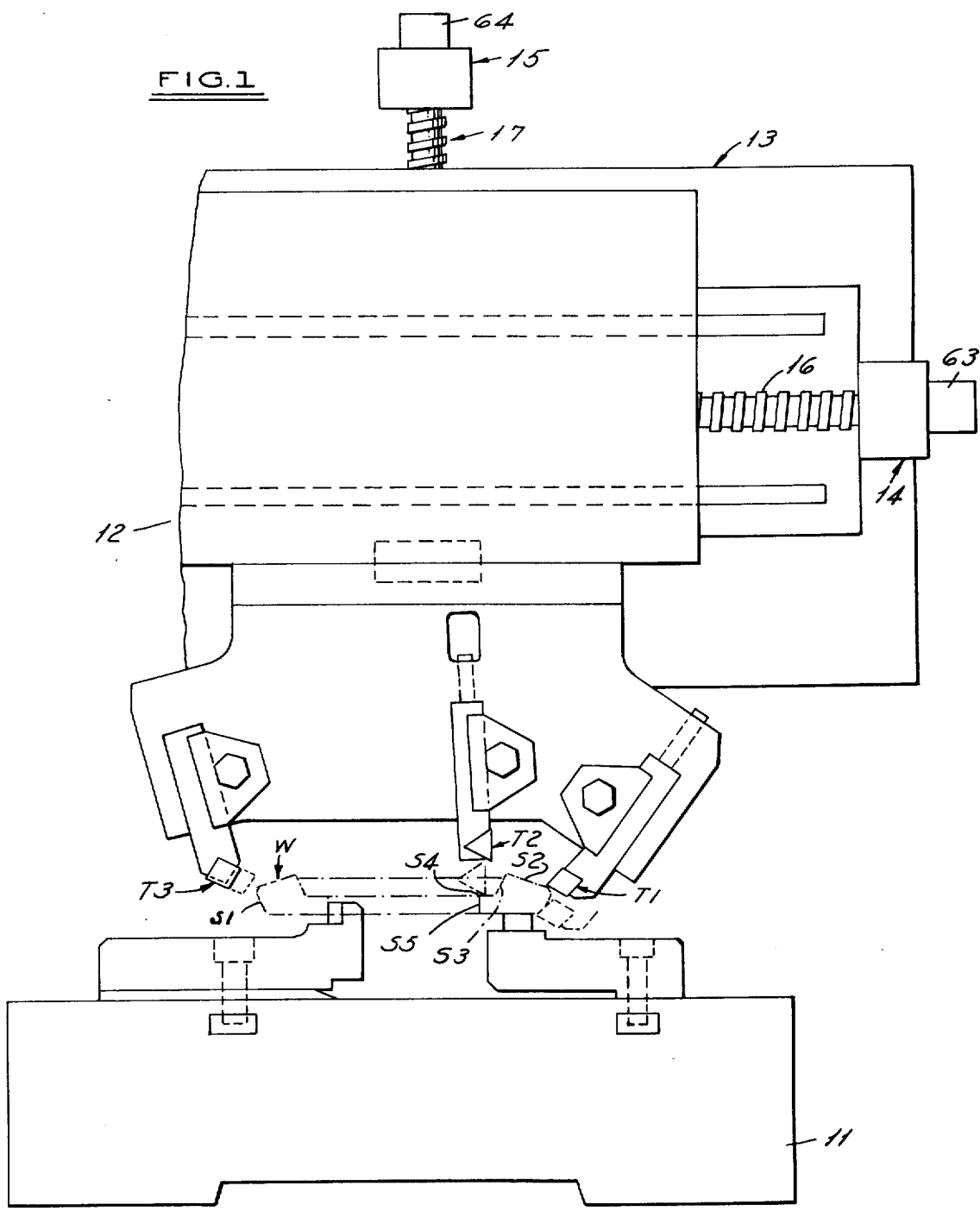
FIG. 1 is a partly diagrammatic elevational view of a machine tool embodying the invention.

Referring to FIG. 1, the invention relates to a multi-axis machine tool such as the tool shown which comprises a base 10 on which a work support 11 is rotatably mounted for rotation at varying speeds depending upon the cycle of operation. A plurality of tools T1, T2, T3 are supported on a slide 12 which is mounted for horizontal movement on a second slide 13 which, in turn, is mounted for vertical movement on the base 10. In such a machine the horizontal motion is designated "X" axis motion and carries the tools in a transverse movement relative to the center line of the workpiece. The vertical motion is designated "Z" axis motion and carries the tools in a parallel movement relative to the axis of the workpiece.

Each slide 12, 13 is driven by a servo drive motor 14, 15 through a screw 16, 17, respectively, to produce the desired movement of the machine tools. The tools T1, T2, T3 are adapted to contact portions of a workpiece W during the cycle of operation to form and shape the surfaces S1, S2, S3, S4, S5.

In accordance with the invention, the movement of the tools in the respective desired manner is achieved by controlling the movement of the slides which, in turn, is controlled by a pair of templates or cams 20, 21. A stylus or follower associated with each said cam, as presently described, produces a mechanical motion which is converted through a gearing into a rotary motion of an electronic resolver. The resolver associated with each axis produces an electronic analog signal. A feedback rotary resolver 63, 64 associated with each slide 12, 13, respectively, produces a corresponding feedback electronic analog signal. The respective analog signals are converted to digital signals, as presently described, and compared to one another. If there is a deviation, a control signal is produced to drive the servo drive motors 14, 15 associated with the slides 12, 13 in the desired direction to produce the desired movement of the tools.

Referring to FIGS. 2–6, the templates or cams 20, 21 are mounted in fixed relationship to one another on a hub 30 which is fixed to a shaft 31 that, in turn, is mounted in a rotary shaft 32 journalled by bearings 33 in a housing 34. A variable D.C. drive motor 35 drives the cams 20, 21 at a preset speed through a high gear ratio gearbox 36 having minimum backlash. Cam followers or styluses 37, 38 in the form of cylindrical pins are mounted on guide bodies 39, 40 and engage the periphery of the cams 20, 21. Each guide body 39, 40 is guided in its vertical movement by a pair of shafts 41, 42 fixed in the housing 34. A rack 43 is associated with each guide body 39, 40 and engages a pinion 44. The pinion 44, in turn, drives a rotary electronic command resolver 45 through gearing 46 and a coupling 47. For example, one revolution of a resolver 45 may correspond to 0.100 inch of linear movement of slides 12, 13.

Figure 6:
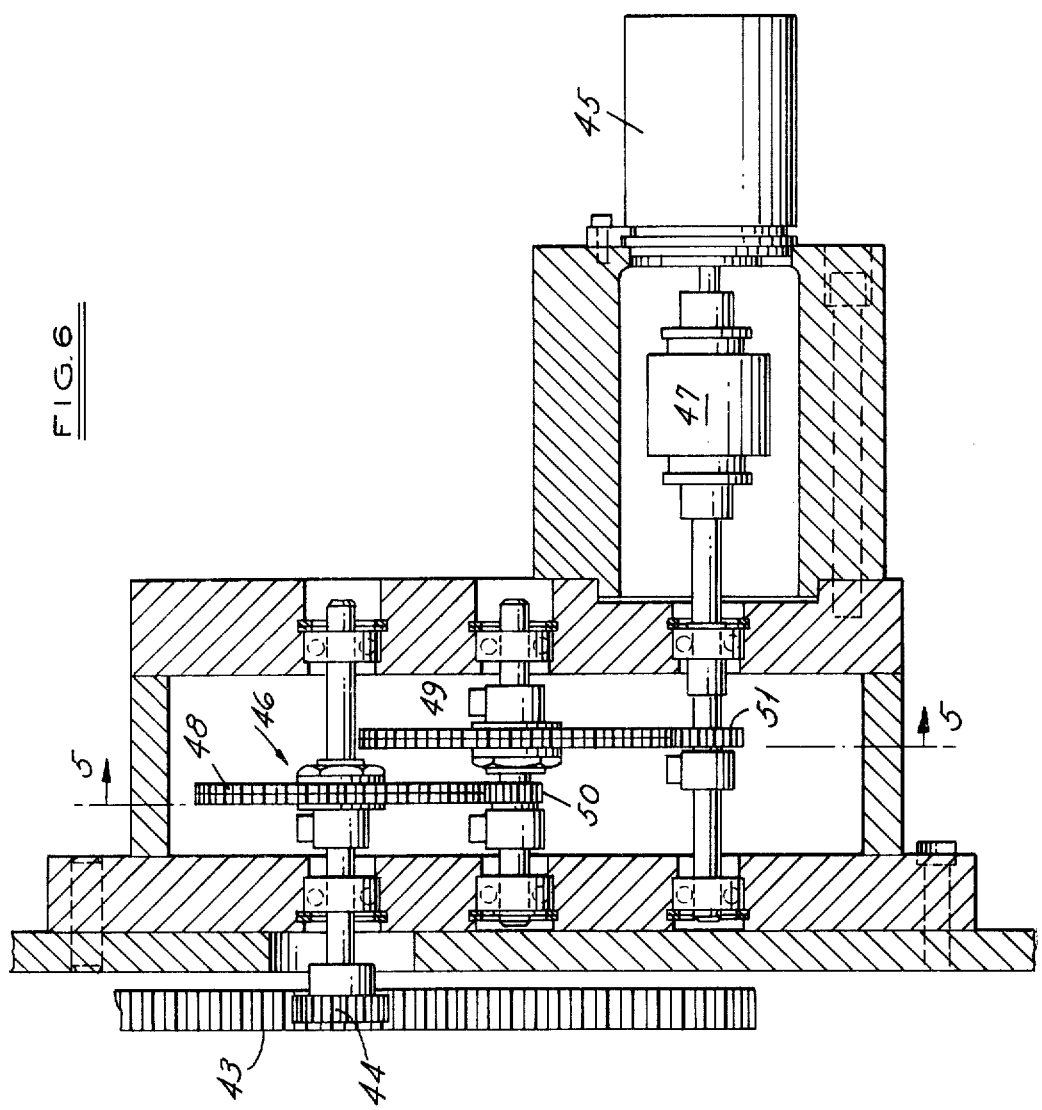
FIG. 6 is a fragmentary sectional view on an enlarged scale of a portion of the apparatus shown in FIG. 3.
Figure 5:
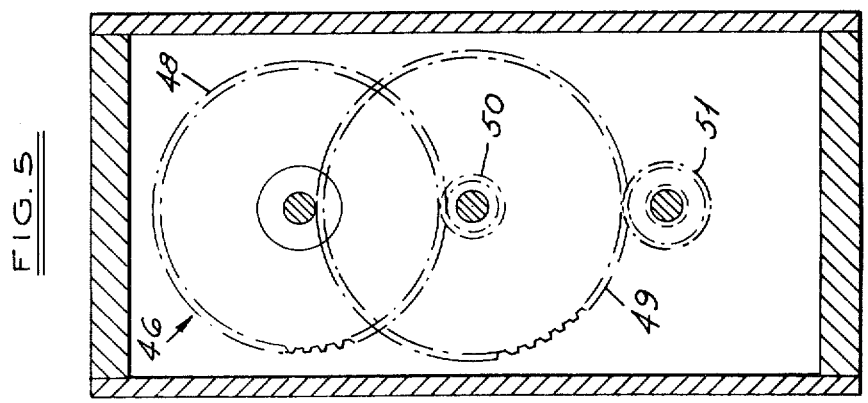
FIG. 5 is a sectional view taken along the line 5—5 in FIG. 6.

As shown in FIG. 6, the gearing 46 comprises split gears 48, 49 meshing with pinions 50, 51. The split gears are provided in order to eliminate any backlash by adjusting the two halves of each gear to take-up any backlash.

Figure 2:
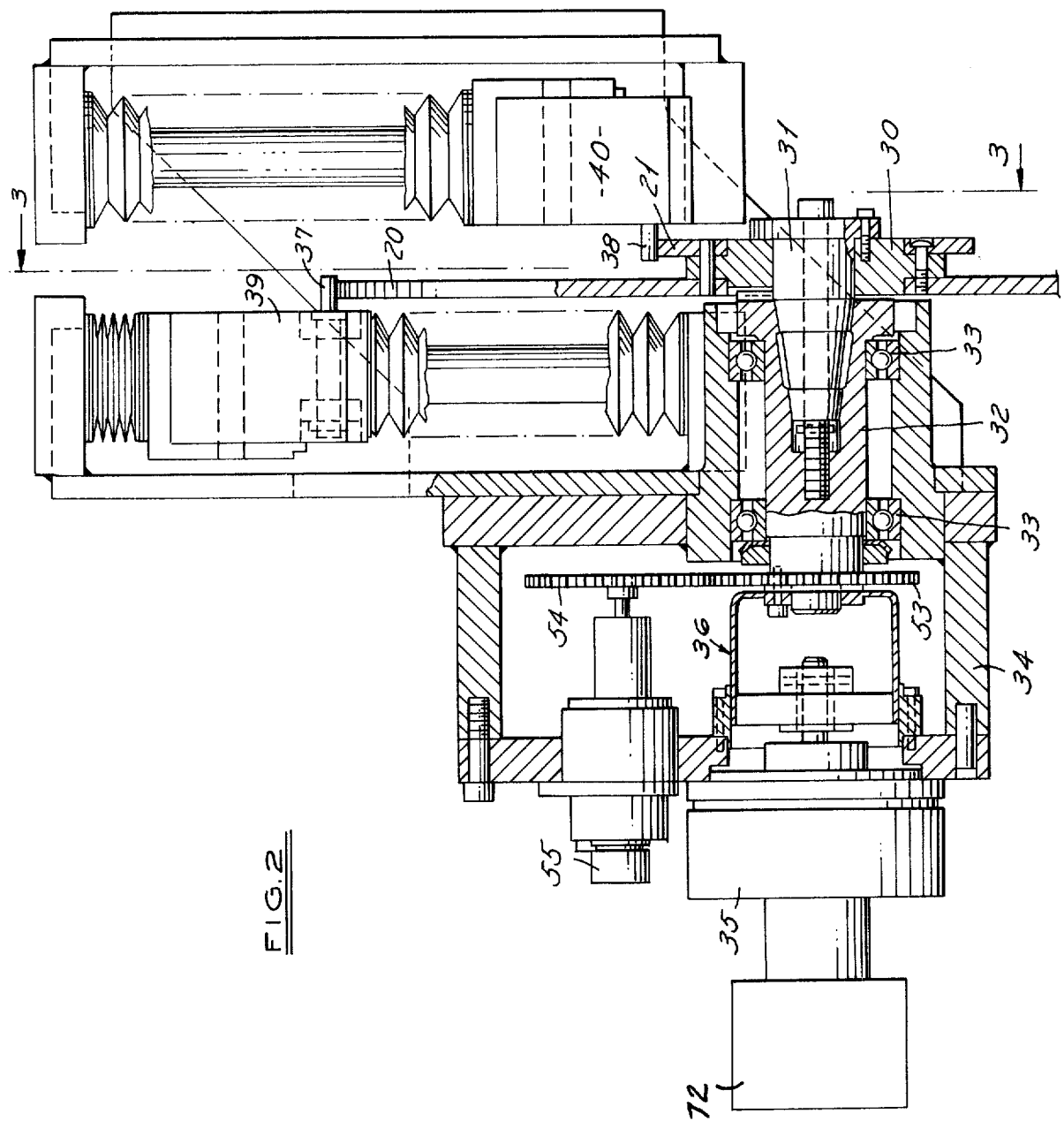
FIG. 2 is a part sectional elevational view of a portion of the system embodying the invention.

As shown in FIG. 2, a take-off gear 53 on the shaft 32 provides a drive to gear 54 and, in turn, the rotor of a position potentiometer 55 which continuously produces a signal that has an output which increases in magnitude as the position of the cams moves through a cycle, thus producing a varying analog signal which represents the location of the stylus with respect to the cams. As presently described a number of other potentiometers are set to produce different levels of analog signals which correspond to various machine functions such as coolant off, coolant on, changing workpiece speed, etc. The different signals are compared with the increasing analog signal from potentiometer 55 and when they coincide, an output voltage is generated to initiate various machine functions.

Referring to FIG. 7, it can be seen that the cam drive assembly 60 drives the cams so that the resolvers associated with the cams forming a part of the axes command offset control 61 produce analog signals that pass to the axes positional control 62. Control 62 compares the signals with the corresponding signals from the follow-up resolvers 63, 64 on the slides and produces an error signal to an X axis servo amplifier 65 or a Z axis servo amplifier 66 for controlling the servo or drive motor of the slide. The cam drive assembly 60 also provides the signal to the electronic machine tool function control 67 which includes the potentiometer 55 which controls various machine tool functions through the machine tool function interface control 68 at various portions of the cycle. A velocity signal is fed back from the slides to control the speed of the slides.

Referring to FIG. 8, it can be seen that the cam drive assembly 60 includes a power package for driving the motor 35 at a predetermined carefully controlled speed. This includes a drive amplifier 70, a power drive amplifier 71 and a tachometer 72.

The drive to the command resolvers 45 is from a sine cosine driver 73, sine generator 74, and reference counter 75. The analog signals from the resolvers 45 pass successively through squaring amplifiers 76 which produce digital signals that are compared with signals from feed back resolvers 63, 64 and squaring amplifiers 77 by demodulators 78 and servo-error circuits 79 and any error signal is then supplied to drive amplifiers 80 for driving the servo motors.

In order to assist in providing an interim movement as when a tool breaks, jog up and jog down switches 81, 82 as well as right axis and left axis switches 83, 84 are provided to provide a signal momentarily for moving the slides up or down or to the left or right as required independently of the cams.

The switches 81–84 provide a signal through the feed back enable circuits 85, servo axis circuits 79 and demodulators 78 as long as the switches 81–84 are closed or depressed to energize the servo motors and move the slides to clear the workpiece and return the slides to their original or home position at the start of the cycle. The cams can then be returned to their home position independently by actuating a drive 35a to return the cams to zero position.

In addition to assist in set up of the machine and in order to accommodate for tool wear, manually operated rotary differential transformers 86, 87 are provided. When the transformers 86, 87 are rotated manually a predetermined amount, an analog signal is passed through resolvers 45 and through the circuitry to energize the servo motors 63, 64 and move the slides a predetermined amount without affecting the rotary relationship of the command resolvers 45 and feed back resolvers 63, 64.

As previously discussed in connection with FIG. 2, potentiometer 55 produces a signal which increases in magnitude as the cams move through a cycle. As shown in FIG. 9, this signal from potentiometer 55 is compared with the signals from pre-set potentiometers 91–99 by comparators 100–108. As the signal from potentiometer 55 reaches and corresponds to the analog signal of each potentiometer 100–108 the respective function of the machine is actuated and controlled during each cycle of operation.

In order to operate the machine, an operator places a workpiece in the support and clamps it in position. He then depresses an automatic cycle start button that initiates rotation of the cams 20, 21. As the cams rotate each stylus 37, 38 follows the contour of its respective cam and produces rotation of its respective resolver 45. As each resolver produces an analog signal it is compared with the analog signal from the respective resolvers 63, 64 on the slides by the circuitry which first converts the analog signals to digital signals. Any differential between the signals is caused to produce a signal for energizing the respective servo motors for driving the slides.

As the cams rotate the increasing analog signal of potentiometer 55 is compared with the signals of preset potentiometers 91–99 to control various machine functions.

At the completion of the cycle upon 360° rotation of the cams 20, 21 the part is removed.

Appropriate controls are provided for terminating the operation at the completion of one cycle.

If a tool is broken, the slides can be returned to their original home position by operating jog switches 81–84 and the cams can be returned to original home position by operating drive 35a.

If tool wear occurs, compensation can be made by manipulating differential transformers 86, 87.

We claim:

1. In a machine tool control, the combination comprising
   a base,
   a first slide mounted on said base for movement along a first axis relative to said base,
   a second slide mounted on said first slide for movement along a second axis transverse to said first slide,
   said second slide being adapted to support at least one tool,
   drive means individual to each slide for moving said slide,
   a work support on said base for supporting a workpiece with its axis parallel to said first axis of said first slide and transverse to said second axis of said second slide,
   means for causing relative rotation between said work support and said slides about the axis of the workpiece,
   a pair of rotary cams,
   one of said rotary cams having a contour for controlling movement of said first slide along said first axis and the other of said rotary cams having a contour for controlling movement of said second slide along said second axis, means for supporting said cams for rotation about a single axis, means for rotating said cams in synchronism, a stylus for each said cam, said stylus following said cam contour as said cam is rotated, a rotary command resolver associated with each said stylus for producing an analog signal in response to movement of said stylus, means for converting mechanical motion of each said stylus as it follows the cam contour of its respective cam into rotary motion of its respective command resolver, a rotary feedback resolver associated with each said slide for producing an analog signal corresponding to the position of said slide along each axis, means for converting the analog signal of each said resolver to a digital signal, means for comparing said digital signals from each said rotary command resolver and its respective feedback resolver for each axis, and means responsive to a predetermined differential between said digital signals for each said axis for actuating said respective drive means of said slides to move said slides and, in turn, said tool relative to said work support.

2. The combination set forth in claim 1 including means for electronically introducing an analog signal to said means for converting the analog signal to a digital signal for each command resolver to cause movement of said slides independently of the position of said styluses on said cams.

3. The combination set forth in claim 2 wherein said last-mentioned means comprises a differential transformer associated with each said slide.

4. The combination set forth in claim 1 including electronic limit switches associated with said system for energizing predetermined functions associated with said system.

5. The combination set forth in claim 4 wherein said electronic limit switches comprise a position potentiometer driven by said rotating means for said cams whereby a signal is produced corresponding to the position of said cams.

a plurality of potentiometers having potentials corresponding to the position at which functions are to be performed in said system, and means for comparing the signals from said position potentiometer and said plurality of potentiometers to produce a control signal at points in the cycle where said potentials correspond.

6. The combination set forth in claim 1 wherein said means for converting mechanical motion of each said stylus to rotational movement of its respective command resolver comprises a stylus body, said stylus mounted on said body, means for guiding said body for straight line movement, a rack associated with said body, a pinion engaging said rack, the respective command resolver being associated with said pinion whereby mechanical movement of said guide body produces rotary movement of said pinion and, in turn, said resolver.

7. The combination set forth in claim 6 including gearing interposed between said pinion and said command resolver for multiplying the rotational movement of said pinion.

8. In a machine tool control, the combination comprising a pair of rotary templates, means for supporting said templates for rotation about a single axis, means for driving said templates in synchronism, a stylus for each said template, said stylus following said templates as said template is rotated, a rotary command resolver associated with each said stylus for producing an analog signal in response to movement of said stylus, and means for converting mechanical motion of each said stylus as it follows the cam contour of its respective cam into rotary motion of said resolver.

9. The combination set forth in claim 8 wherein said means for converting mechanical motion of said stylus to rotational movement of said resolver comprises a stylus body, said stylus mounted on said body, means for guiding said body for straight line movement, a rack associated with said body, a pinion engaging said rack, the respective resolver being associated with said pinion whereby mechanical movement of said guide body produces rotary movement of said pinion and, in turn, said resolver.

10. The combination set forth in claim 9 including gearing interposed between said pinion and said resolver for multiplying the rotational movement of said pinion.

* * * * *